(12) United States Patent
Allison

(10) Patent No.: US 10,214,928 B2
(45) Date of Patent: Feb. 26, 2019

(54) WIRELESS CONTROL SYSTEM AND METHOD FOR MOBILE HYDRAULIC STAGES

(71) Applicant: Progressive Products, Inc., Pittsburg, KS (US)

(72) Inventor: Todd N. Allison, Pittsburg, KS (US)

(73) Assignee: Progressive Products, Inc., Pittsburg, KS (US)

( * ) Notice: Subject to any disclaimer, the term of this patent is extended or adjusted under 35 U.S.C. 154(b) by 270 days.

(21) Appl. No.: 15/162,265

(22) Filed: May 23, 2016

(65) Prior Publication Data

US 2016/0340920 A1    Nov. 24, 2016

Related U.S. Application Data

(60) Provisional application No. 62/165,492, filed on May 22, 2015.

(51) Int. Cl.
| | |
|---|---|
| *E04H 3/28* | (2006.01) |
| *G05B 15/02* | (2006.01) |
| *H04W 4/80* | (2018.01) |
| *E04B 1/344* | (2006.01) |

(52) U.S. Cl.
CPC .............. *E04H 3/28* (2013.01); *G05B 15/02* (2013.01); *H04W 4/80* (2018.02); *E04B 1/3442* (2013.01)

(58) Field of Classification Search
CPC .................................. E04H 3/28; H04W 4/80
See application file for complete search history.

(56) References Cited

U.S. PATENT DOCUMENTS

| | | | | |
|---|---|---|---|---|
| 3,620,564 | A * | 11/1971 | Wenger ................. | B60P 3/0252 160/19 |
| 5,152,109 | A * | 10/1992 | Boers .................... | B60P 3/0252 296/26.02 |
| 5,546,709 | A * | 8/1996 | Decker .................... | E04H 3/28 296/26.07 |
| 6,176,495 | B1 * | 1/2001 | Decker .................... | B60S 9/12 280/6.153 |
| 8,678,941 | B2 * | 3/2014 | Bilsen ................... | B60P 3/0252 446/427 |
| 8,978,311 | B1 * | 3/2015 | Uhl ....................... | B60P 3/0252 52/36.1 |
| 2015/0162865 | A1 | 6/2015 | Cowham | |

FOREIGN PATENT DOCUMENTS

| | | |
|---|---|---|
| CA | 2634803 | 12/2009 |
| CN | 105080166 | 11/2015 |

OTHER PUBLICATIONS

"Official Action for Canadian Patent Application No. 2,930,783", dated Jul. 4, 2017.

* cited by examiner

*Primary Examiner* — Thomas E Lazo
(74) *Attorney, Agent, or Firm* — Law Office of Mark Brown, LLC; Christopher M. DeBacker

(57) ABSTRACT

A deployable mobile stage system including a remote mobile computing device which acts as a controller. The mobile computing device can be any basic personal computing device such as a smart phone, tablet computer, laptop, or proprietary control unit. The mobile computing device interfaces wirelessly with a receiver unit located on the mobile stage. The receiver unit relays commands to a hydraulic system which then commands various valves to open and/or close, thereby transforming the mobile stage from a first, deployed position to a second, transport position or back.

4 Claims, 3 Drawing Sheets

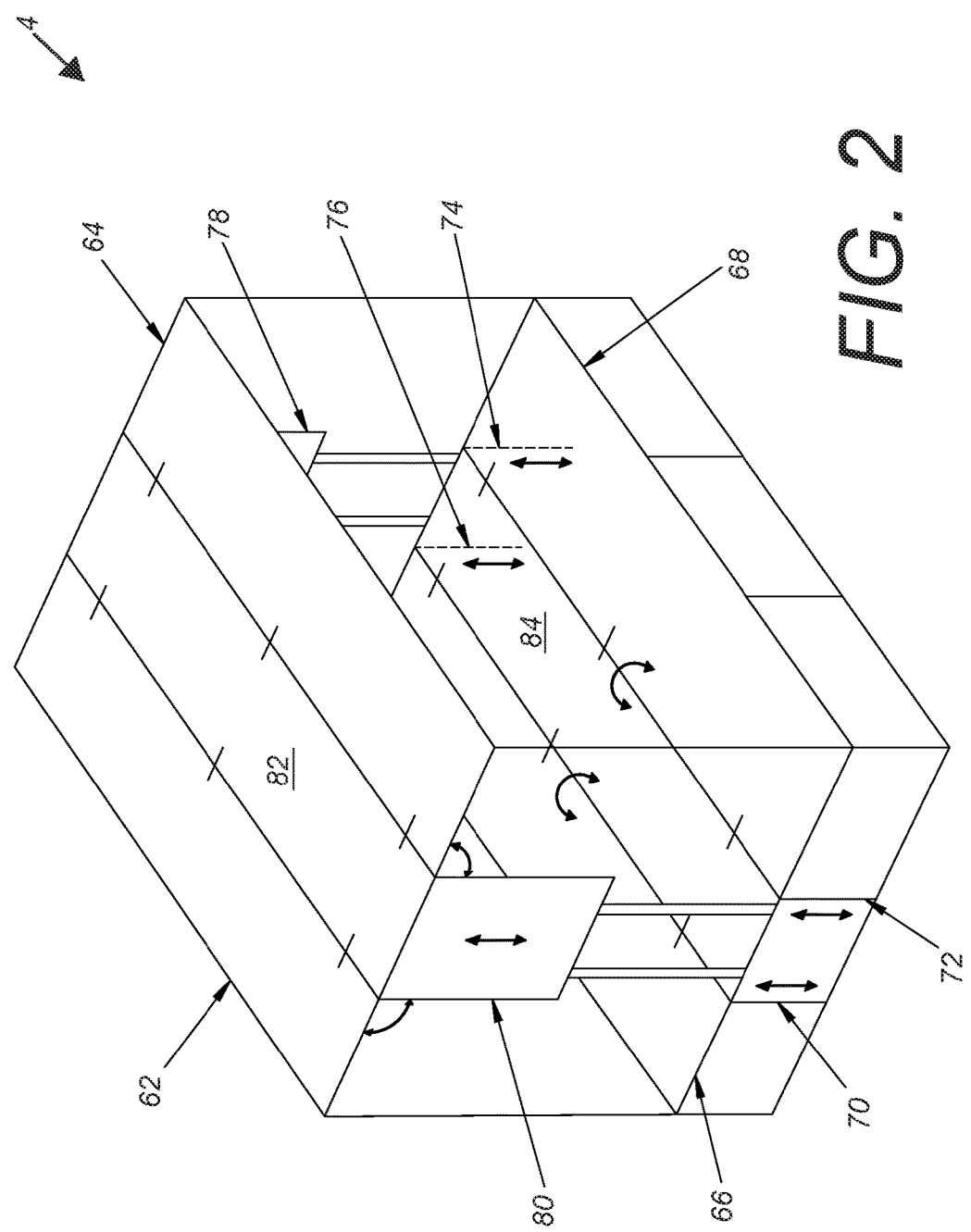

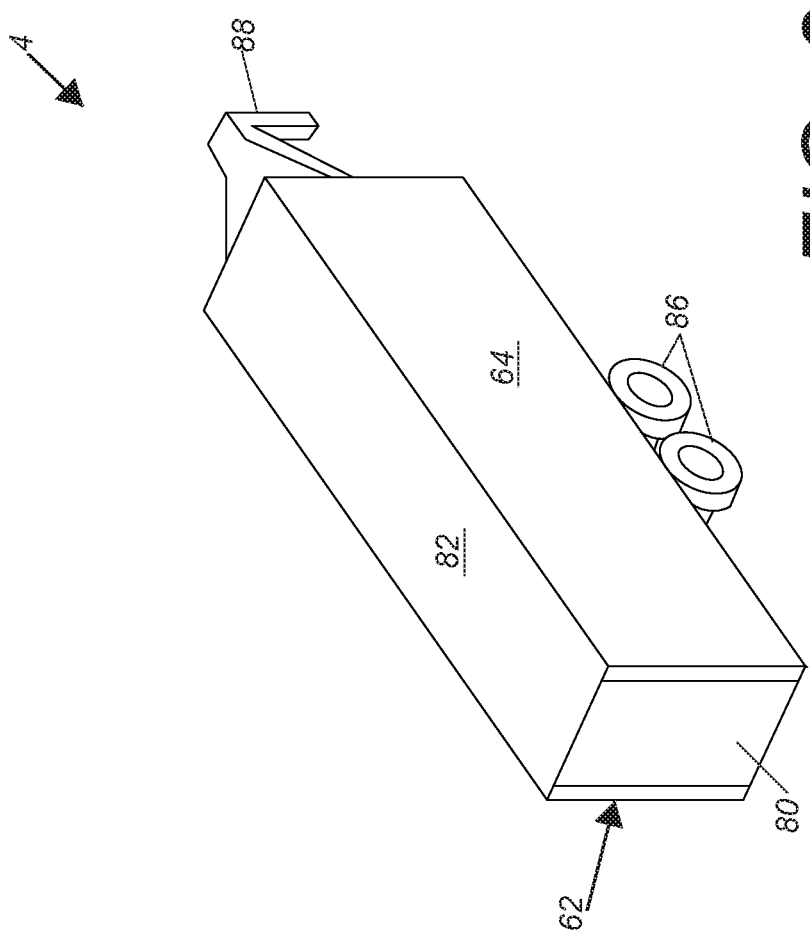

WIRELESS CONTROL SYSTEM AND METHOD FOR MOBILE HYDRAULIC STAGES

CROSS-REFERENCE TO RELATED APPLICATION

This application claims priority in U.S. Provisional Patent Application No. 62/165,492, filed May 22, 2015, which is incorporated herein by reference.

BACKGROUND OF THE INVENTION

1. Field of the Invention

The present invention relates generally to a wireless control system and method for use thereof, and more specifically to a wireless control system for a mobile hydraulic transforming stage system.

2. Description of the Related Art

Mobile performance stages are commonly used for temporary venues, performances, or rallies. Typical mobile performance stages must be assembled on site. Modern mobile stages may come in the form of a trailer, wherein the mobile stage is collapsible to a compact and mobile unit.

Mobile stages are often an economical alternative to erecting a permanent stage at a site. The typical reasons for electing to use a mobile stage include temporary use, cost, and reliability. Cutting the costs of using a mobile stage provides additional incentive for using a mobile stage. The simplest way to cut costs would be to reduce the number of persons and steps required to setup and operate the stage. Costs are also saved when the owner of a mobile stage knows the stage will last. These cost savings can be passed on to customers, increasing the incentive to use one mobile stage over another.

What is needed is a highly transportable stage system with a controller to allow the stage to be transformed from a compact/transportation position to a functional stage position and back.

Heretofore there has not been available a system or method for a mobile hydraulic stage with the advantages and features of the present invention.

BRIEF SUMMARY OF THE INVENTION

The present invention generally provides a deployable mobile stage system including a remote mobile computing device which acts as a controller. The mobile computing device can be any basic personal computing device such as a smart phone, tablet computer, laptop, smart watch (or other smart accessory) or a proprietary control unit. The mobile computing device interfaces wirelessly with a receiver unit located on the mobile stage. The receiver unit relays commands to a hydraulic system which then commands various valves to open and/or close, thereby transforming the mobile stage from a first, deployed position to a second, transport position or back.

BRIEF DESCRIPTION OF THE DRAWINGS

The drawings constitute a part of this specification and include exemplary embodiments of the present invention illustrating various objects and features thereof.

FIG. 2 is a three-dimensional isometric view of a mobile stage in a first, deployed position as controlled via a preferred embodiment of the present invention.

FIG. 3 is a three-dimensional isometric view of a mobile stage in a second, transport position as controlled via a preferred embodiment of the present invention.

DETAILED DESCRIPTION OF THE PREFERRED EMBODIMENTS

I. Introduction and Environment

Figure 1:
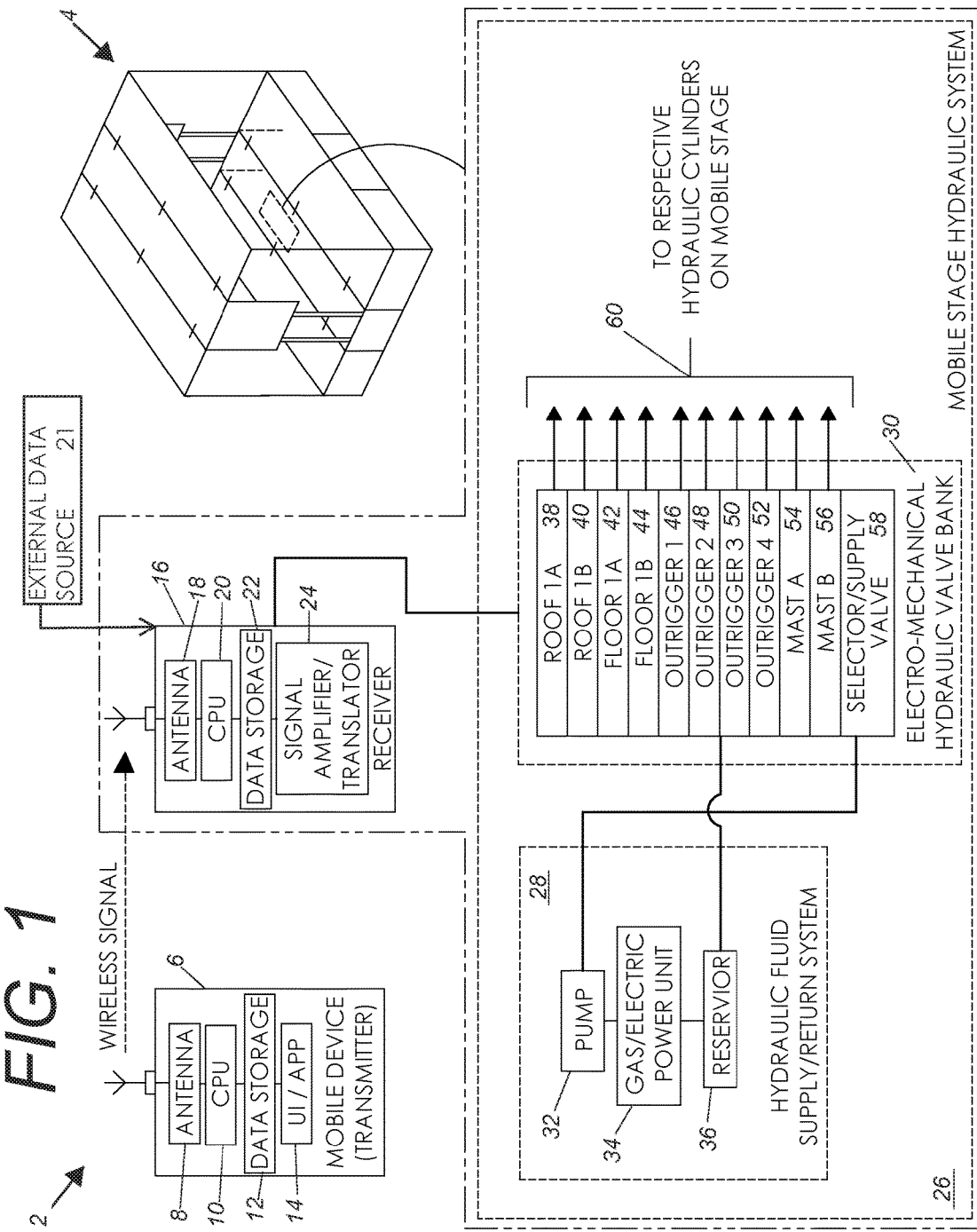
FIG. 1 is a box diagram representing the elements encompassing a preferred embodiment of the present invention.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning. Additional examples include computing devices such as a mobile smart device including a display device for viewing a typical web browser or user interface will be commonly referred to throughout the following description. The type of device, computer, display, or user interface may vary when practicing an embodiment of the present invention. A computing device could be represented by a desktop personal computer, a laptop computer, "smart" mobile phones, PDAs, tablets, smart watches, or other handheld computing devices.

II. Preferred Embodiment Mobile Stage Control System 2

Previously, the operation of a mobile hydraulic stage has required a user to manipulate the stage set-up using either a wired or wireless control pack. This can be cumbersome to the user as these packs are often large and inconvenient to carry around. However, modern mobile devices such as cell phones, tablets, laptops and wearable technology have wireless technology built into them and are commonplace in today's society. Being able to use an application installed onto one of these small, mobile "smart" devices to operate a mobile hydraulic stage provides a user with a much more convenient process when setting up or taking down the stage. These operations involve walking, climbing and otherwise moving around the stage performing inspections to ensure that the stage is properly deployed and that it properly returns to a pre-set-up state. Using a small "smart" wireless device to control the stage during these procedures would expedite the process and allow the operator freedom of motion without being restrained by physical wires or cumbersome control units.

Bluetooth and Wi-Fi are two commonly present forms of wireless technology which could be used to interface from the control application to the stage, however, any wireless technology available (now or in the future) could be used instead.

Referring to the figures in more detail, FIG. 1 shows a mobile stage control system 2 generally including a collapsible mobile stage 4 which can transform from a first, deployed position (FIG. 2) to a second, transport position (FIG. 3), a mobile computing device 6, a receiver 16, and a mobile stage hydraulic system 26. Generally, the mobile computing device 6 communicates wirelessly with the receiver 16 located in proximity with the mobile stage 4 and mobile stage hydraulic system 26.

The wireless computing device 6, which could be a proprietary device or an existing personal computing device such as a smart phone, tablet computer, or laptop computer, includes an antenna 8 for wirelessly communicating with the receiver 16, a CPU 10 for handling application data and processing commands, data storage 12 for storing a software application 14 used to control the hydraulic system 26 and to transform the stage 4.

Similarly, the receiver 16 includes an antenna 18 for receiving commands sent by the wireless computing device 6, a CPU 20 for processing signals received by the antenna 18 and transmitting commands to the mobile stage hydraulic system 26, data storage 22 for storing data and software relevant to the control of the mobile stage 4, and a signal amplifier/translator 24 necessary for communicating commands from the mobile computing device 6 to the mobile stage hydraulic system 26 components.

The receiver 16 may receive other data, such as external, third-party data from an external data source 21. This data could include weather data, wind speed data, temperature data, or other data relevant to how the receiver 16 CPU 20 would handle commands received from the mobile device 6 and transfer those commands onto the hydraulic system 26. As an example, if inclement weather is detected the CPU 20 may indicate a warning to the users either via the mobile device 6 or some other method, and may automatically withdraw some or all stage elements, such as lowering some of the side walls to prevent wind damage. These variables could be considered external control variables.

The mobile stage hydraulic system 26 is made of up generally two parts: the hydraulic fluid supply and return system 28 and the electro-mechanical hydraulic valve bank 30. The fluid supply/return system 28 generally includes the pump 32 for the hydraulic fluid, a power unit 34 (e.g. gasoline, diesel, or electric motor), and a fluid reservoir 36 for storing the hydraulic fluid.

The electro-mechanical hydraulic valve bank 30 includes a number of valves corresponding with respective components of the mobile stage 4 as shown in FIG. 2. A roof 1A valve 38 connects to and controls a roof 1A panel 62 which hinges away from the static roof panel 82, and a similar roof 1B valve 40 connects to and controls a roof 1B panel 64 which again hinges away from the central static roof panel 82, as depicted in FIG. 2. This forms a covering for the floor of the stage.

A floor 1A valve 42 is connected to and controls a floor 1A panel 66 which hinges away from a central static floor panel 84. Similarly a floor 1B valve 44 is connected to and controls a floor 1B panel 68 which hinges the opposite direction away from the static central floor panel 84. This forms the base of the stage.

Four outrigger valves, outrigger #1 46; outrigger #2 48; outrigger #3 50; and outrigger #4 52, correspond with and connect and control respective outrigger #1 70; outrigger #2 72; outrigger #3 74; and outrigger #4 76 to raise and lower the stage floor from the ground.

Two mast valves, mast A 54 and mast B 56 respectively connect to and control a pair of masts, mast A 78 and mast B 80, which raise and lower the sides of the stage, thereby raising the roof panels 62, 64, 82 away from the floor panels 66, 68, 84.

The various valves 38-56 receive hydraulic fluid through a selector/supply valve 58 and dispense hydraulic fluid out to the various respective components of the mobile stage 4 through an outlet 60 to the various hydraulic cylinders.

FIG. 3 shows the mobile stage 4 in a compact, transport position. It can be mounted onto a trailer or otherwise be affixed with wheels 86 and a tow bar 88 for towing the stage from one location to another, where it can then be redeployed using the control system as described above.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A mobile stage control system comprising:
   a remote mobile computing device including a CPU, data storage, communications antenna, and graphical user interface (GUI) configured to interact with a software application stored on said data storage and accessible by said CPU;
   a receiver unit affixed to a mobile stage, said receiver unit including a communications antenna, a CPU, data storage, and a signal amplifier, said receiver unit configured to receive control commands from said remote mobile computing device;
   a hydraulic system configured to transform said mobile stage from a first, deployed position to a second, transport position via a plurality of hydraulic valves connected to a plurality of structural elements of said mobile stage, said hydraulic system including at least one selector/supply valve;
   an external data source wireless in communication with said receiver unit;
   said external data source transmitting control variables to said CPU of said receiver unit;
   whereby said CPU may automatically send control commands to said hydraulic system based upon said control variables; and
   wherein commands are sent, by said mobile computing device CPU, to said receiver unit, and wherein said commands instruct said hydraulic system to automatically move at least one of said plurality of structural elements of said mobile stage.

2. The mobile stage control system of claim 1, further comprising:
   said mobile stage comprising a roof including a first roof panel and a second roof panel;
   said hydraulic system including a first roof hydraulic valve corresponding with said first roof panel and a second roof hydraulic valve corresponding with said second roof panel;
   wherein said first roof hydraulic valve is configured to activate a first roof hydraulic cylinder which moves said first roof panel from a first, deployed position to a second, transport position; and
   wherein said second roof hydraulic valve is configured to activate a second roof hydraulic cylinder which moves said second roof panel from a first, deployed position to a second, transport position.

3. The mobile stage control system of claim 1, further comprising:
   said mobile stage comprising a floor including a first floor panel and a second floor panel;

said hydraulic system including a first floor hydraulic valve corresponding with said first floor panel and a second floor hydraulic valve corresponding with said second floor panel;

wherein said first floor hydraulic valve is configured to activate a first floor hydraulic cylinder which moves said first floor panel from a first, deployed position to a second, transport position; and wherein said second floor hydraulic valve is configured to activate a second floor hydraulic cylinder which moves said second floor panel from a first, deployed position to a second, transport position.

4. A method of transforming a mobile stage from a first position to a second position, the method comprising the steps:

wirelessly transmitting, from a remote mobile computing device, commands to a mobile stage receiver unit, said remote mobile computing device including a CPU, data storage, communications antenna, and graphical user interface (GUI) configured to interact with a software application stored on said data storage and accessible by said CPU;

receiving, with said mobile stage receiver unit, said commands, said mobile stage receiver unit affixed to a mobile stage and including a communications antenna, a CPU, data storage, and a signal amplifier, said receiver unit configured to receive control commands from said remote mobile computing device;

controlling, with said mobile stage receiver unit, a hydraulic system configured to transform said mobile stage from a first position to a second position via a plurality of hydraulic valves connected to a plurality of structural elements of said mobile stage, said hydraulic system including at least one selector/supply valve;

wirelessly receiving, with said mobile stage receiver unit, control variables transmitted by an external data source;

transmitting control variables to said CPU of said receiver unit;

automatically sending control commands, with said CPU of said receiver unit, to said hydraulic system based upon said control variables; and automatically activating said hydraulic system such that at least one of said plurality of structural elements of said mobile stage are moved via at least one hydraulic cylinder powered by said hydraulic system.

* * * * *